United States Patent [19]

Banton

[11] Patent Number: 5,426,519
[45] Date of Patent: Jun. 20, 1995

[54] METHOD AND APPARATUS FOR IMPLEMENTING ACCURATE ANGLE SCREENS

[75] Inventor: Martin E. Banton, Fairport, N.Y.

[73] Assignee: Xerox Corporation, Stamford, Conn.

[21] Appl. No.: 295,578

[22] Filed: Aug. 25, 1994

[51] Int. Cl.$^6$ ............................................... H04N 1/52
[52] U.S. Cl. ..................... 358/533; 358/534; 358/536
[58] Field of Search ............... 358/534, 535, 536, 533, 358/456, 457, 458, 459, 460, 454, 455, 298

[56] References Cited

U.S. PATENT DOCUMENTS

| | | | |
|---|---|---|---|
| 3,688,033 | 8/1972 | Hell et al. | |
| 3,997,911 | 12/1976 | Perriman et al. | 358/534 |
| 4,051,536 | 9/1977 | Roetling | 358/298 |
| 4,149,183 | 4/1979 | Pellar et al. | 358/534 |
| 4,149,194 | 4/1979 | Holladay | 358/460 |
| 4,185,304 | 1/1980 | Holladay | 358/298 |
| 4,499,489 | 2/1985 | Gall et al. | 358/536 |
| 4,680,645 | 7/1987 | Dispoto et al. | 358/298 |
| 4,868,587 | 9/1989 | Loce et al. | 346/157 |
| 4,930,023 | 5/1990 | Yakame | 358/457 |
| 5,014,123 | 5/1991 | Imoto | |
| 5,223,953 | 6/1993 | Williams | 358/456 |
| 5,225,915 | 7/1993 | Ciccone et al. | 358/454 |
| 5,237,432 | 8/1993 | Calarco et al. | 358/451 |
| 5,258,849 | 11/1993 | Tai et al. | 358/298 |

OTHER PUBLICATIONS

Yang, Roger Yea-Dong "Method for Laying Out Halftone Screens in Color Printing Using Shifted Screens," *Xerox Disclosure Journal*, vol. 18, No. 4, Jul./Aug. 1993, pp. 447–450.

Genovese, Frank C. "Method to Normalize Current and Linearize Deflection in the Fist Ion System," *Xerox Disclosure Journal*, vol. 18, No. 2, Mar./Apr. 1993, pp. 153–159.

*Primary Examiner*—Scott A. Rogers
*Attorney, Agent, or Firm*—Duane C. Basch

[57] ABSTRACT

The present invention is a method and apparatus for processing a color document for moiré-free printing, the color document including a plurality of color separations each defined with a set of image signals representing optical density with m possible density levels, while a printer is capable of rendering density with n density levels. The invention employs a spatial resolution scaler to produce m-bit signals at a spatial resolution that is a function of the halftone screen angle, base dot pitch, and desired halftone cell size. Subsequently, the m-bit signals at the desired spatial resolution (frequency and angle) are halftoned to produce n-bit signals that are printed with a raster output scanning-type printer suitable for printing at selectively variable spots per inch in both the fast and slow scan directions.

16 Claims, 7 Drawing Sheets

METHOD AND APPARATUS FOR IMPLEMENTING ACCURATE ANGLE SCREENS

This invention relates generally to a method and apparatus for generating halftone dot screens for color imaging, and more particularly to generating dot screens having optimized angular relationships therebetween while being of the same screen frequency.

BACKGROUND AND SUMMARY OF THE INVENTION

Color in documents is the result of a combination of a limited set of colors over a small area, in densities selected to visually integrate to a desired color response. This is accomplished in many printing devices by reproducing separations of the image, where each separation provides varying density of a single primary color. When combined together with other separations, the result is a full color image.

In the digital printing and reproduction of documents, a separation is conveniently represented as a monochromatic bitmap, which may be described as an electronic image having a plurality of discrete signals (pixels) defined by position and density. In such a system, density is described as one of a number of possible states or levels. When more than two levels of density are used in the description of the image, the levels are often termed "gray", indicating that the density varies between a maximum and minimum, without reference to actual color. Most printing systems have the ability to reproduce an image with a small number of density levels, most likely two, although higher numbers of levels are possible. Common input devices including document scanners, digital cameras and the computer image generators, however, are capable of representing an image with a substantially larger number of gray levels or densities. A commonly selected number is 256 levels, although larger and smaller density ranges are possible. It is required that an image initially described at a large set of levels also be characterizable using a smaller set of levels, in a manner which captures the intent of the user. In digital reproduction of color documents this means that each of the color separations is reduced from the input number of levels to a smaller output number of levels. The multiple color separations are combined at printing to yield a final color print. Commonly, color documents are formed using cyan, magenta and yellow colorants or cyan, magenta, yellow and black colorants, although use of a larger number of primary colors, or alternative colorants, may be possible.

In the process of printing documents, the desired density of color over an area is commonly achieved by halftoning, where density variation of a color separation is achieved by placing greater or fewer "ON" pixels in a discrete area of a separation. In one halftoning method known as dithering or screening, over a given area comprising a number of gray separation pixels, a value representing the density of each pixel of an array of gray separation pixels is compared to one of a set of preselected thresholds (the thresholds are stored as a dither matrix and the repetitive pattern generated by this matrix is considered a halftone cell) as taught, for example, in U.S. Pat. No. 4,149,194 to Holladay or U.S. Pat. No. 5,223,953 to Williams which teaches an alternative hardware implementation of Holladay. The effect of such an arrangement is that, for an area where the image is gray, some of the thresholds within the dither matrix will be exceeded, i.e. the image pixel value is larger than the threshold value stored in the dither matrix for that same location, while others are not. In the binary case, the separation pixels or cell elements for which the thresholds are exceeded might be printed as a maximum colorant value, while the remaining separation pixels are allowed to remain as white (background), depending on the actual physical quantity described by the data. The described invention produces an output pattern that is periodic or quasi-periodic in the respective spatial coordinates, so as to implement accurate angle screens.

Dithering, however, creates problems in color document reproduction where the repeating pattern of a screen through the image, when superposed over similar repeating patterns for the remaining separations, causes moiré or other artifacts. These problems arise particularly in printing systems with less than ideal registration between separations. It is also noted that moiré remains a problem even for perfectly registered printing devices.

A color halftoning scheme using different angles for some or all of the color separations is common for applications that have slight misregistrations due to physical limitations. Accordingly, and with reference again to the Holladay patent (U.S. Pat. No. 4,194,194), the angle of the screen can be changed to generate similar screen patterns which do not strongly beat visually against each other, with the result that objectionable moiré is reduced or eliminated. Particularly critical are the angles between the most prominent colors, cyan, magenta and black (if present). A common arrangement of rotated screen angles is 0°, 15°, 45° and 75° for yellow, cyan, black and magenta, respectively, in which case all separations are commonly halftoned using the same screen frequency, sometimes with the exception of yellow. However, objectionable patterning may still occur. Thus, the problem of moiré is directly related to the inability of singleresolution output devices to achieve the accurate angles and frequencies necessary to reduce the periodic structure. While the problem may theoretically be reduced by using arbitrarily high resolutions (allowing closer approximation of the desired screen angles), such systems are more expensive and may not achieve the accurate angles so as completely eliminate moiré. The present invention enables accurate angle screens without the necessity and impracticality of very high output resolutions.

The above described halftoning processes generate periodic halftone patterns. Other methods exist that generate non-periodic or quasi non-periodic structure. Examples for such methods are error diffusion and similar halftoning processes, stochastic screening and pulse density modulation. Yet another alternative to rotated screen halftoning is disclosed by Yang in the Xerox Disclosure Journal, Vol. 18, No. 4.

Some have proposed halftoning techniques that more or less directly emulate angularly oriented optical halftone screening functions, for example, U.S. Pat. No. 3,997,911 to Perriman et al. (Issued Dec. 14, 1976), U.S. Pat. No. 4,051,536 to Roetling (Issued Sep. 27, 1977) and U.S. Pat. No. 4,149,183 to Pellar et al. (Issued Apr. 10, 1979). Others have focused on modulating the size of the halftone dots that are written into tiled arrays of electronically generated halftone cells at a selected screen angle. See, for example: U.S. Pat. No. 3,688,033 to Hell et al. (Issued Aug. 29, 1972); U.S. Pat. No.

4,499,489 to Gall et al. (Issued Feb. 12, 1985); U.S. Pat. No. 4,680,645 to Dispoto et al. (Issued Jul. 14, 1987); and U.S. Pat. No. 5,258,849 to Tai et al. (Issued Nov. 2, 1993). Some have also described techniques applicable to electronic printing systems, for example, U.S. Pat. No. 4,868,587 to Loce et al. (Issued Sep. 19, 1989) and U.S. Pat. No. 4,185,304 to Holladay (Issued Jan. 22, 1980). In addition, U.S. Pat. No. 5,225,915 to Ciccone et al. illustrates that the addition of noise or enhancement of inherent noise can mask the structure moiré. However, such schemes inherently alter the accuracy of the image.

In accordance with the present invention, there is provided a color document printing system for eliminating moiré in printed output, the color document including a plurality of color separations wherein each separation is defined with a set of image signals representing optical density with m possible density levels, comprising: a printer, capable of rendering density with n density levels, adapted to print the color separations at distinct spatial resolutions, so that when the color separations are superposed on a substrate, a selected color is defined; a source of image signals describing the color document with a plurality of color separations, each image signal representing optical density as one of m levels for a discrete area of a color separation; a spatial resolution scaler, operatively connected to said source of image signals; a first halftone processor, operatively connected to said spatial resolution scaler, for reducing the number of levels m representing optical density in a subset of the color separations to a number of levels n representing optical density, said processor generating a first periodic pattern at a first spatial resolution; a second halftone processor, operatively connected to said spatial resolution scaler, for reducing the number of levels m representing optical density in at least one remaining color separation to a number of levels n representing optical density, said processor generating a second periodic pattern at a second spatial resolution; and a video processor directing the distinct spatial resolution signals processed at each halftone processor to said printer to print the processed color image.

In accordance with another aspect of the present invention, there is provided a method for preparing a color document for moiré-free printing, the color document including a plurality of color separations wherein each separation is defined with a set of image signals representing optical density with m possible density levels, while a printer is capable of rendering density with n density levels, comprising: receiving a set of image signals describing the color document with a plurality of color separations, each image signal representing optical density as one of m levels for a discrete area of a color separation; spatially scaling the image signals of a first color separation; halftoning the m level image signals of the first color separation to n level image signals representing optical density in a manner generating a first periodic pattern having a fixed frequency and a distinct first angle for the first separation; halftoning the m level image signals of a second color separation to n level image signals representing optical density in a manner generating a second periodic pattern having the fixed frequency and a distinct second angle for the second separation; and directing the first and second periodic patterns to said printer to print the processed color image.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the method and apparatus of the present invention, reference is made to the drawings. In the drawings, like reference numerals have been used throughout to designate identical elements. In the present case, gray image data may be characterized as image signals, each pixel of which is defined at a single level or optical density. Each pixel will be processed in the manner described herein, to redefine each pixel in terms of a new set of levels. One common case of this method includes the conversion of data from a relatively large set of gray levels to one of two binary levels for printing by a binary printer.

In describing the present invention, the terms pixel and subpixel have been utilized. These terms may refer to an electrical (or optical, if fiber optics are used) signal which represents the measurable optical properties within a physically defined region on a document or receiving medium. The medium may be any tangible document, photoreceptor, or marking material transfer medium. The terms pixel and subpixel may also refer to an electrical (or optical) signal representing the measurable optical properties of physically definable region on a display medium. A plurality of physically definable regions for either situation represents the physically measurable optical properties of the entire image to be rendered by either a material marking device, electrical or magnetic marking device, or optical display device. Lastly, the term pixel may refer to an electrical (or optical) signal representing physical optical property data generated from a photosensitive element when scanning a physical image, so as to convert the physical optical properties of the image to an electronic or electrical representation. In other words, in this situation, a pixel is an electrical (or optical) representation of the physical optical properties of an image measured at a definable area by an optical sensor.

As used herein, the term "dot" refers to a product or an image resulting from a screening process. A "screen cell", as used herein, refers to the set of pixels which together will form the dot, while the term "screen matrix" will be used to describe the set of values which together make up the set of thresholds to be applied. As previously described, a "pixel" refers to an image signal associated with a particular position in a digital image, frequently having a density between white (minimum) and black (maximum). Accordingly, pixels are defined by intensity and position. A dot is made up of a plurality of pixels. While printers print pixels (sometimes referred to as "spots") halftoning methods tend to cluster the pixels together into a dot. Dots of clustered pixels have better reproduction characteristics on most printing hardware than unclustered pixels. These terms are used for simplification and it should be understood that the appropriate sizing operations have to be performed for images where the input resolution in terms of scan pixels is different from the output resolution in terms of print pixels.

In the particular color system to be discussed, color documents are multiple sets of image signals, each set of signals (or separation) may be represented on an independent channel, which is usually processed independently. A "color image" as used herein is therefore an electronic document including at least two color separations, such as in the Xerox 4850 Highlight Color Printer and commonly three or four separations, such as in the Xerox 4700 Color Laser Printer or the Xerox 5775 Digital Color Copier, or sometimes more than 4 separations. One possible digital copier (a document scanner/printer combination) is described for example, in U.S. Pat. No. 5,014,123 to Imoto, incorporated herein by reference.

Each separation provides a set of image signals which will drive a printer to produce one color of the image. In the case of multicolor printers, the separations superposed together form the color image. In this context, we will describe pixels as discrete image signals, which represent optical density of the document image in a given small area thereof. The term "pixel" will be used to refer to such an image signal in each separation, as distinguished from "color pixel", which is the sum of the color densities of corresponding pixels in each separation. "Gray", as used herein does not refer to a color unless specifically identified as such. Rather, the term refers to image signals which vary between maximum and minimum, irrespective of the color of the separation in which the signals are used.

Figure 1:
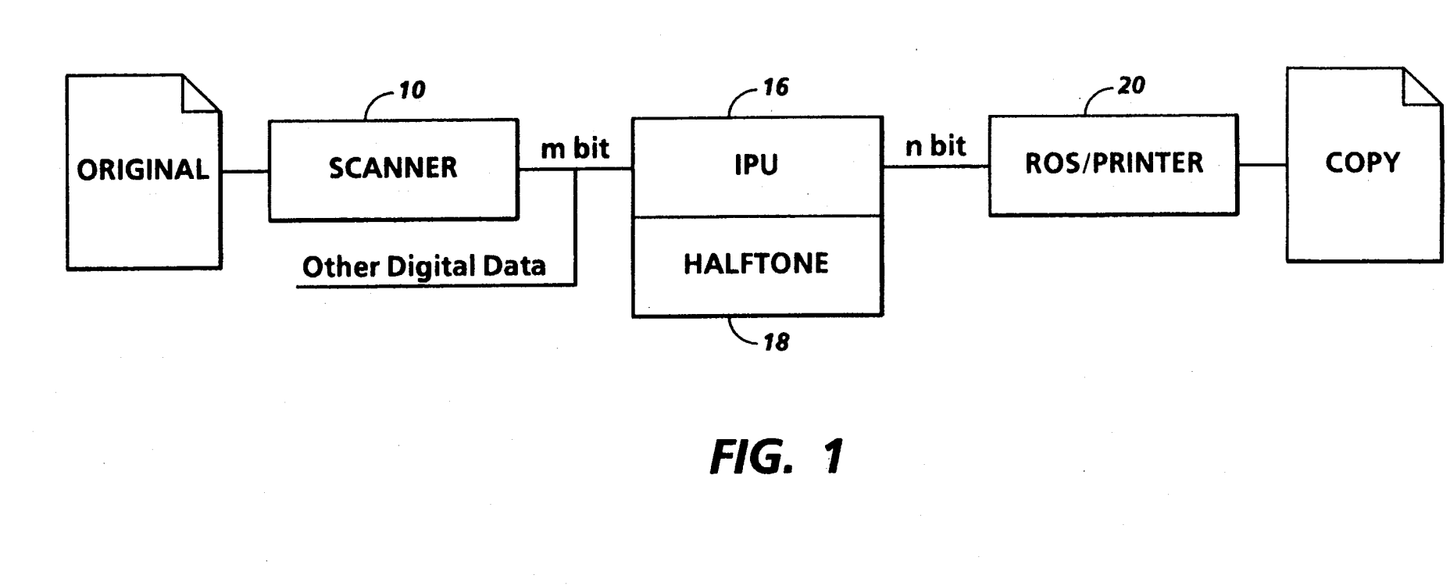
FIG. 1 is a simplified illustration of a digital color printer in which the present invention may find advantageous use.

FIG. 1 shows a general system representing the goal of the invention, an electronic representation of a document (hereinafter, an image) from an image input terminal such as scanner 10 derives electronic digital data in some manner, in a format related to the physical characteristics of the device, and commonly with pixels defined at m bits per pixel. Common color scanners, such, for example, Xerox 5775 Digital Color Copiers, or the Pixelcraft 7650C, produce 8-bit/pixel/separation data (or 24 bits/pixel for 3-color separations), at resolutions acceptable for many purposes. Since this is a color document, the image is defined with two or more separation bitmaps, usually with identical resolution and pixel depth. The electronic image signals are directed through an image processing unit (IPU) 16 to be processed so that an image suitable for reproduction on raster output scanner (ROS) or printer 20 is obtained. Image processing unit 16 includes a halftone processor 18 which converts m-bit digital image signals to n-bit digital image signals, suitable for driving a particular printer, where m and n are integer values.

Figure 2:
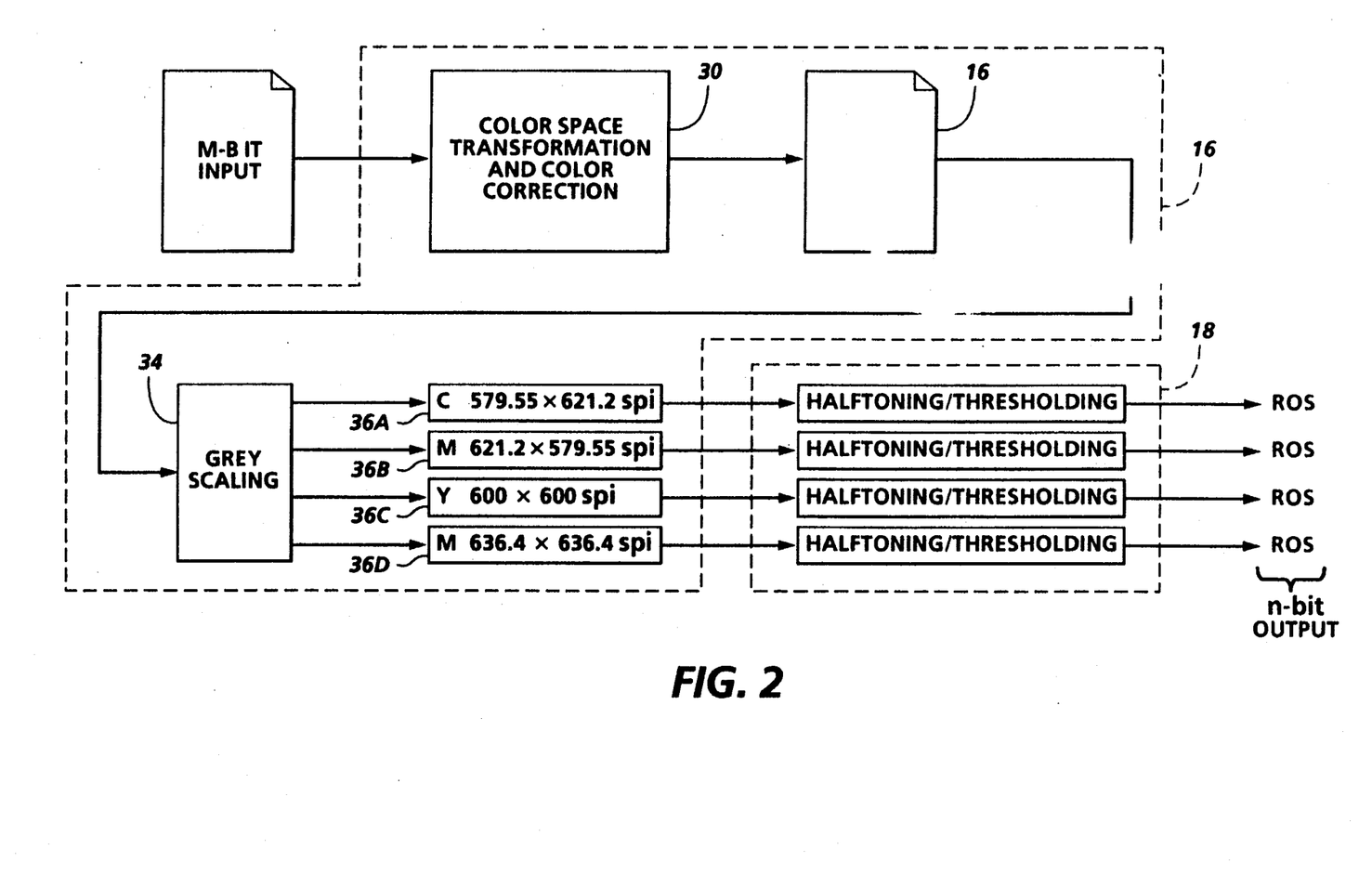
FIG. 2 is is a schematic block diagram of an image processing circuit in which the invention is implemented.
Figure 3A:
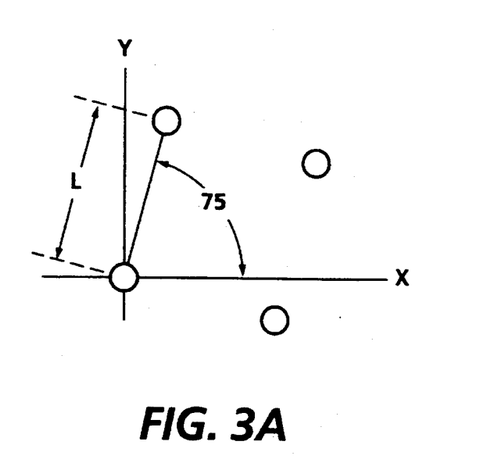
FIGS. 3A, 3B, 3C, and 3D are illustrations of the four color separation halftone dot arrangements achieved in accordance with the present invention.
Figure 3B:
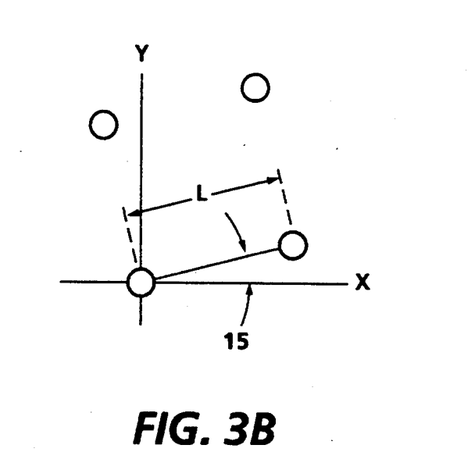
Figure 3C:
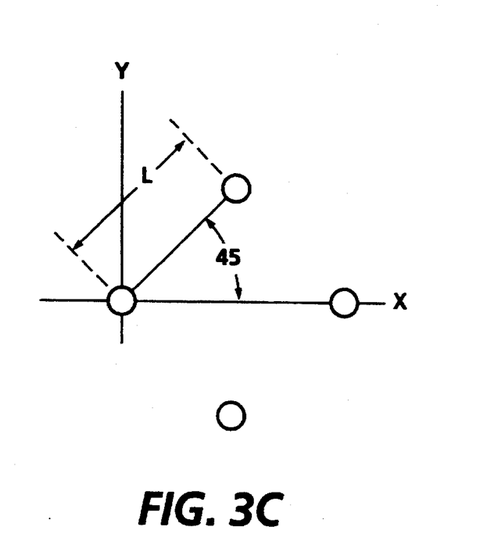
Figure 3D:
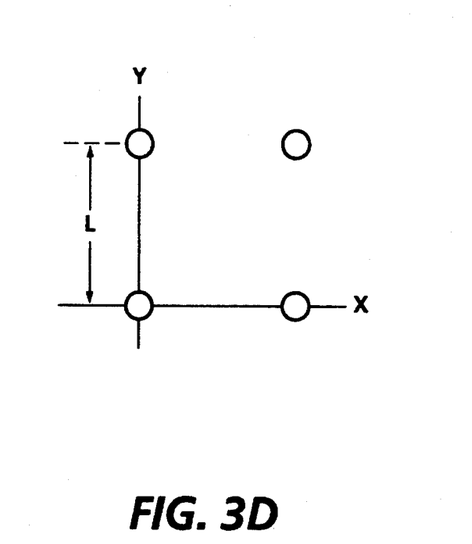

FIG. 2 illustrates the operational characteristics of IPU 16 and halftone processor 18. Four separations, C(x,y), M(x,y), Y(x,y), K(x,y), are each processed independently for halftoning purposes to reduce the m-bit input to an n-bit output, where x and y represent the two dimensional position within an image. In accordance with the invention, the cyan (C), magenta (M), yellow (Y) and black (K) separations are processed with a screening method, preferably with rotated screens.

Initially, the mobit color separation input to IPU 16 is processed by transformation/correction block 30 which corrects the m-bit per pixel signals in accordance with well-known color correction techniques. Subsequently, the color corrected C, M, Y, and K image 32 is passed to a spatial resolution scaler 34 for gray scaling operations.

Figure 4:
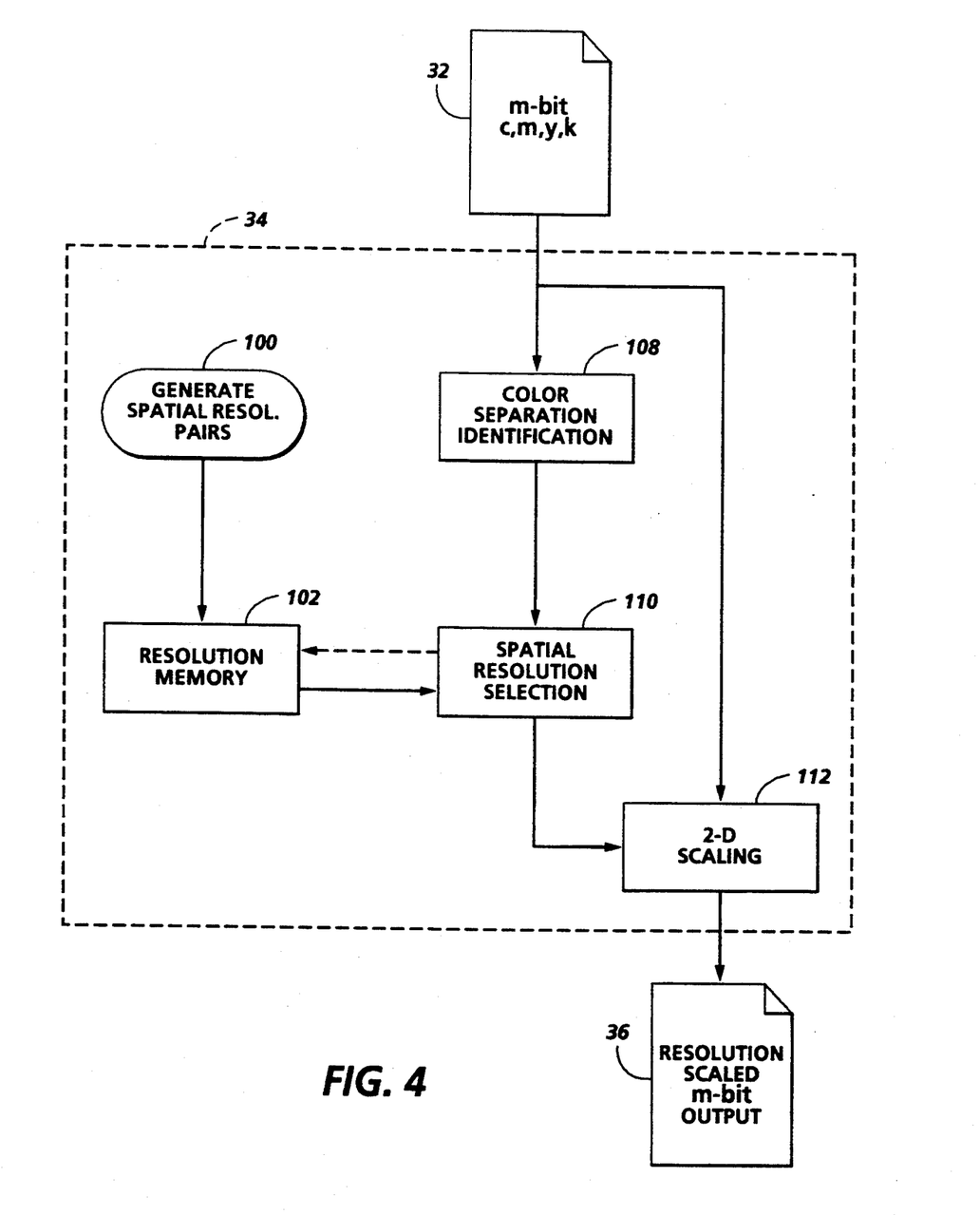
FIG. 4 is block flow diagram illustrating the operation of the gray scaling aspect of the image processing circuit of FIG. 2.

Operation of spatial resolution scaler 34 will be described in conjunction with the rotated screens of FIGS. 3A–3D, the block flow diagram of FIG. 4, and the following equations. Based upon the premise that the C, M, Y, and K color separations should employ angles differing by exactly 30° in order to eliminate moiré, the desired angles are illustrated in the examples of FIGS. 3A through 3D, where each halftone dot employs a common screen dot pitch (spacing between adjacent dots) represented therein as L. Furthermore, the angle for the yellow separation is treated as a separate case as it has the least visual impact and has been assigned an angle of 0° (zero). Referring to FIGS. 3A-3D, the x and y direction spatial resolutions, in spots per inch (spi), for the C, M, Y and K separations can be represented mathematically as follows:

$$M_x = [(L\cos(15°))/n_{M_x}]^{-1} \quad (1a)$$

$$M_y = [(L\sin(15°))/n_{M_y}]^{-1} \quad (1b)$$

$$K_x = [(L\cos(45°))/n_{K_x}]^{-1} \quad (2a)$$

$$K_y = [(L\sin(45°))/n_{K_y}]^{-1} \quad (2b)$$

$$C_x = [(L\cos(75°))/n_{C_x}]^{-1} \quad (3a)$$

$$C_y = [(L\sin(75°))/n_{C_y}]^{-1} \quad (3b)$$

$$Y_x = (L/n_{Y_x})^{-1} \quad (4a)$$

$$Y_y = (L/n_{Y_y})^{-1} \quad (4b)$$

where, for example, $n_{M_x}$ is the number of pixels in the x-direction for the magenta dot. The n value being determined as a function of the closest achievable representation of the desired angle. For example, to accomplish a 15° screen angle, one would have to orient the corresponding pixels of a repeating screen a distance of plus four in the x-direction and plus one in the y-direction—producing an angle of $\simeq 14.04°$. The choice of angles in the above equations, as reflected in FIGS. 3A–3D, are well known to reduce the visual sensitivity to the screen moiré. To generate the requisite spatial resolution pairs (in the x- and y-directions) for each color separation, block 100 of FIG. 4, a value is chosen for L (the dot pitch) and for the desired n values. The following values are used as an illustrative example:

$$L = 1/150 \approx 0.00666;$$
$$n_{M_x} = 4, \quad n_{M_y} = 1;$$
$$n_{K_x} = 3, \quad n_{K_y} = 3;$$
$$n_{C_x} = 1, \quad n_{C_y} = 4; \text{ and}$$
$$n_{Y_x} = 4, \quad n_{Y_y} = 4.$$

The resulting spatial resolutions, in x, y pairs are illustrated in the left-most column of Table 1, where examples of other resolutions are included for different dot pitches.

TABLE 1

|       | L = 1/150 | L = 1/175 | L = 1/200 |
|-------|-----------|-----------|-----------|
| $M_x$ | 621.2     | 724.69    | 828.22    |
| $M_y$ | 579.55    | 676.15    | 772.74    |
| $K_x$ | 636.4     | 742.46    | 848.53    |
| $K_y$ | 636.4     | 742.46    | 848.53    |
| $C_x$ | 579.55    | 676.15    | 772.74    |
| $C_y$ | 621.2     | 724.69    | 828.22    |
| $Y_x$ | 600       | 700       | 800       |
| $Y_y$ | 600       | 700       | 800       |

These spatial resolution pairs are preferably predetermined by an arithmetic logic unit (ALU) or similar processing device, and the resulting resolutions stored in resolution memory 102 for subsequent use during the processing of an image for printing. As illustrated in FIG. 4, block 108 identifies the color separation to which the incoming image signals are associated. The color separation identification operation may be accomplished by suitable logic hardware, for example, a multiplexer and latch combination designed to interrogate at least a pair of bits in the incoming data stream. More specifically, a two-bit identifier could be used to indicate one of the four color separations in the present embodiment, however, additional bits may be employed should there be more than four separations.

Once the color separation has been identified, the separation information is passed to the spatial resolution selection block 110 to select, from memory 102, the spatial resolution pair associated with the identified color separation. Subsequently, the values stored in the memory are passed to 2-D scaling block 112, in conjunction with the m-bit input signals to process the color separation data and produce a plurality of output signals at the predetermined spatial resolutions reflected in FIG. 2 as separations 36A, 36B, 36C and 36D. 2-D scaling block may be any resolution scaling mechanism suitable for accomplishing non-integer resolution conversion of a stream of image signals, such as a linear, 2-dimensional scaling application specific integrated circuit. For example, the system described by Calarco et al. in U.S. Pat. No. 5,237,432 (Issued Aug. 17, 1993) directed to an "Image Scaling Apparatus," hereby incorporated by reference, or similar non-integer resolution conversion techniques.

Figure 5:
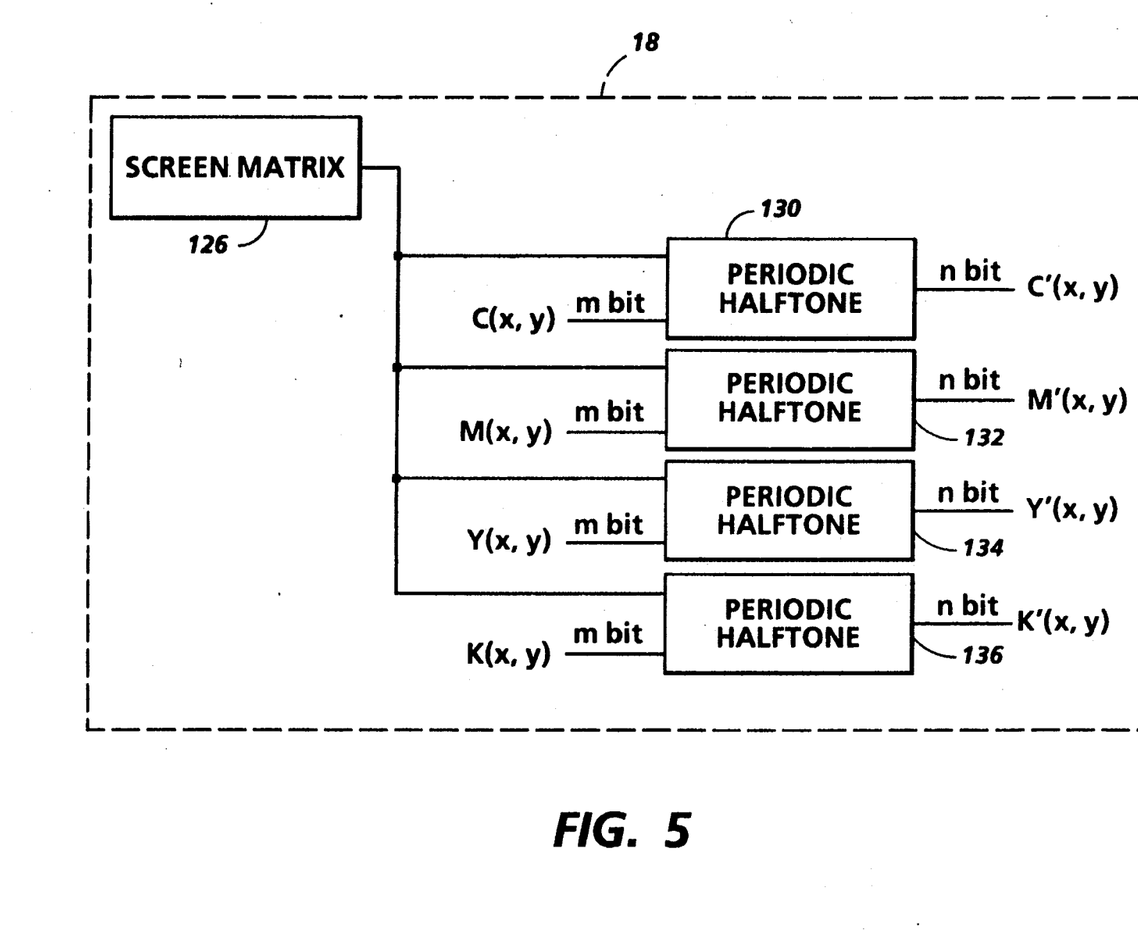
FIG. 5 is a schematic block diagram of a halftoning circuit in which the halftoning operation of FIG. 1 may be implemented.

Subsequent to producing the resolution scaled color separations 36A–36D, the separations are halftoned by halftone processor 18. As illustrated in FIG. 5, these may be a plurality of periodic halftone processors (130, 132, 134, and 136), using a screen matrix stored in screen matrix memory 126, which, for a given gray level reproduce a periodic dot pattern. While screening may be described for simplicity as the addition of a set of selected screen values to image signals within a defined area of the image along with a uniform application of a threshold level(s) to the combined values, it will be understood that the process of screening is commonly represented by a set of varying thresholds defined at locations corresponding to pixels over a given area of the image. A screen cell is generally smaller than the total image and will be replicated in a predetermined scheme for processing the image in order to cover an area of the image. A method for an efficient representation of variable or rotated angle screen cells by a screen matrix and a corresponding replication scheme, is given in U.S. Pat. No. 4,149,194 to Holladay, and is hereby incorporated by reference in the instant specification for its teachings.

The output of a process using a screen cell is a set of pixels, defined by a set of levels typically having a number of states less than the input set of state values. Commonly, the set of n-bit output values is binary, either black or white, or a spot or no spot, although the values might be gray. The binary output of a single halftone cell is a set of pixels that are either black or white, which together form a "dot". The periodic halftone processors 130, 132, 134 and 136 return an n bit value representing the separation. It will no doubt be appreciated that the present invention might also be effective with one or more of the color separations, for example the black separation, halftoned using non-periodic methods such as error diffusion. As mentioned, the n-bit output values may be gray, for example 4-bits per pixel, in which case the maximum number of levels for the halftone dots described in the embodiment would be 136 for magenta (M), 144 for black (K), 136 for cyan (C) and 128 for yellow (Y). Alternatively, the number of levels may be increased by the well-known practice of employing multi-centered halftone dots, wherein halftone dot growth occurs in sub-cell regions (i.e., quadrants) of the halftone cell.

Figure 6:
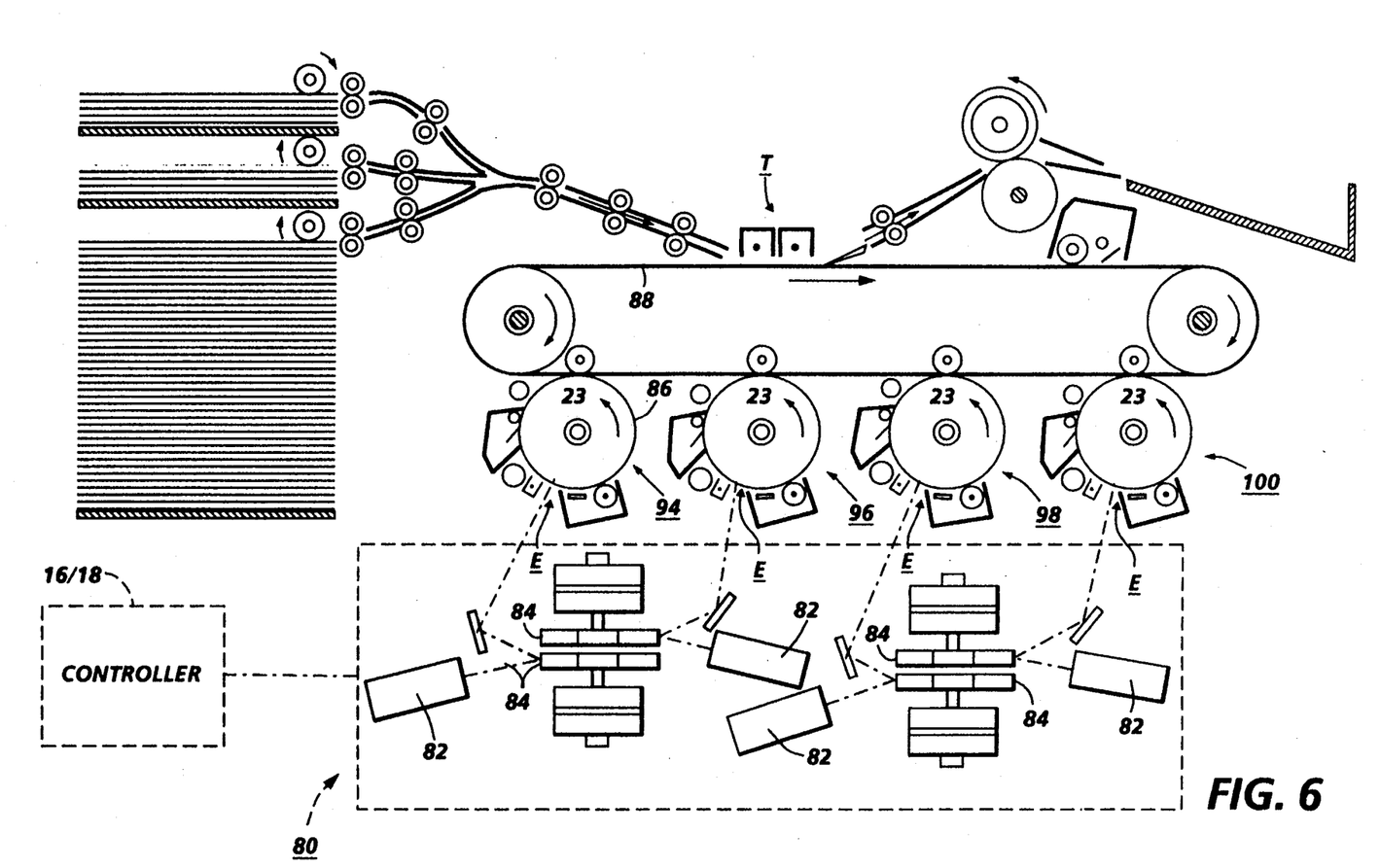
FIG. 6 is an illustration of the xerographic engine of a single-pass, raster output scanning printer suitable for use in printing images processed in accordance with the present invention.

Turning now to the printing, by the ROS/Printer, of the color separations having differing spatial resolutions, it is understood that such variation may be accomplished using a polygon-based ROS. Specifically contemplated is the use of a variable speed polygon motor in conjunction with a variable pixel frequency video driver to control the laser or similar exposure mechanism. It is further understood that in a multiple pass color printer or digital reprographic machine (where a single exposure station is employed), it would be necessary that the ROS utilize a variable speed polygon, wherein the speed could be changed in an interdocument gap so as to achieve the resolution changes necessary to produce the desired halftone dots. Alternatively, as generally illustrated by FIG. 6, a multiple beam ROS 80 may be employed with a plurality of lasers 82 to produce beams (dashed lines) to be reflected off of the facets of polygons 84. Each of the polygons 84 operates at a unique speed to expose one or more photoreceptors at one of a plurality of exposure stations E, for example, where the individual marking engines 94, 96, 98, or 100 may be used to produce color separations (C, M, Y, and K) at the desired pixel frequencies and scanning rate. More specifically, the figure shows four lasers 82 wherein the beam or beams generated by each is driven or modulated in accordance with one of the outputs of halftone processor 18 (indicated generally in FIG. 6 by controller 16/18). Subsequently, the reflected beams expose a surface of photoreceptors 86 within marking engines 94, 96, 98, and 100. Once exposed at station E, the respective photoreceptors 86 rotate in a direction indicated by arrow 23 to first develop the latent electrostatic image and then transfer the developed image to intermediate member 88. Thereafter, the composite image present on the intermediate member is transferred to a document sheet passing in close proximity to the member in the transfer region designated by the letter T. Further details of the printing system illustrated in FIG. 6 are found in U.S. patent application Ser. No. 08/168,300 by Castelli et al. (filed Dec. 17, 1993), the relevant portions of which are hereby incorporated by reference.

Figure 7:
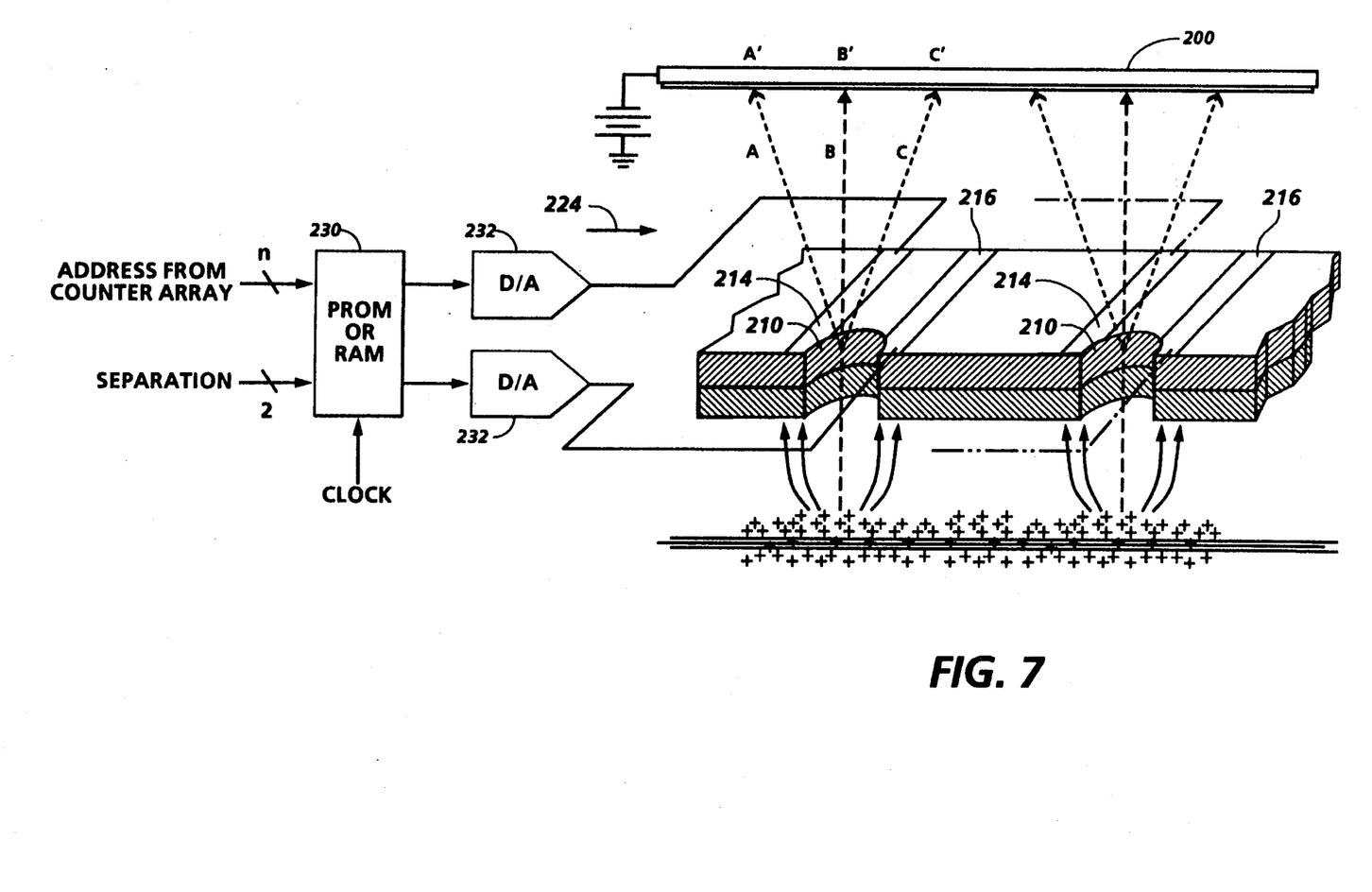
FIG. 7 is an illustration of an alternative, focused ion stream device, suitable for use in a printing system for printing images processed in accordance with the present invention.

Alternatively, ROS/Printer 20 may be a focussed ion stream printer as described, for example, by F. Genovese in the *Xerox Disclosure Journal* publication "Method to Normalize Current and Linearize Deflection in the FIST Ion System," Vol. 18, No. 2, (March/April 1993) pp. 153–59, the teachings of which are hereby incorporated by reference. In a focussed ion stream printer, a portion of which is depicted in FIG. 7, the exposure of a region on the surface of charge receptor 200 above apertures 210 is controlled by voltages being applied to the associated electrodes 214 and 216. As the charge receptor 200 moves relative to the the apertures, in a process direction that would be out of the page as illustrated, the voltages on electrodes 214 and 216 are varied so as to cause the deposition of charged ions on the lower surface of the charge receptor. More importantly, the position on the surface at which the ions are deposited (A', B', or C') can also be controlled as a function of the variation in voltage between the left (214) and right (216) electrodes on any particular aperture 210 so as to control the ion deposition, via streams A, B, or C, in the fast-scan direction indicated by arrow 224 at a desired location on the surface of charge receptor 200. Slow scan positioning, and resolution, is understandably controlled as a function of the speed at which charge receptor 200 moves relative to the apertures and the frequency at which the image raster signals are output.

It is further contemplated that a focused ion stream print bar such as that depicted in FIG. 7 and as disclosed by F. Genovese in the *Xerox Disclosure Journal*, may be employed in single- and multiple-pass marking systems. With respect to a multiple-pass color system, the focused ion stream alternative is particularly valuable because there are no mechanical time constants as are found in the ROS-based printer. Accordingly, the increased addressability necessary for the implementation of the angled screens of the present invention is readily achievable. Moreover, the sequence of voltages needed to control apertures 210 would preferably be predetermined and stored in a look-up table configuration for memory 230 so that the voltage would be easily generated by digital output from the look-up table memory to digital-to-analog converters 232 and 234.

In recapitulation, the present invention is a method and apparatus for processing a color document for moiré-free printing, the color document including a plurality of color separations each defined with a set of image signals representing optical density with m possible density levels, while a printer is capable of rendering density with n density levels. The invention employs a spatial resolution scaler to produce m-bit signals at a spatial resolution that is a function of the halftone screen angle, base dot pitch, and desired halftone cell size. Subsequently, the m-bit signals at the desired spatial resolution are halftoned to produce n-bit signals that are printed with a raster output scanning-type printer suitable for printing at selectively variable frequencies.

It is, therefore, apparent that there has been provided, in accordance with the present invention, a method and apparatus for generating halftone dot screens for color imaging, and more particularly to generating dot screens having optimized angular relationships therebetween and being of the same screen frequency. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A color document printing system for eliminating moiré in printed output, the color document including a plurality of color separations wherein each separation is defined with a set of image signals representing optical density with m possible density levels, comprising:
   a printer, capable of rendering density with n density levels, adapted to print the color separations at distinct spatial resolutions, so that when the color separations are superposed on a substrate, a selected color is defined;
   a source of image signals describing the color document with a plurality of color separations, each image signal representing optical density as one of m levels for a discrete area of a color separation;
   a spatial resolution scaler, operatively connected to said source of image signals;
   a first halftone processor, operatively connected to said spatial resolution scaler, for reducing the number of levels m representing optical density in a subset of the color separations to a number of levels n representing optical density, said processor generating a first periodic pattern at a first spatial resolution;
   a second halftone processor, operatively connected to said spatial resolution scaler, for reducing the number of levels m representing optical density in at least one remaining color separation to a number of levels n representing optical density, said processor generating a second periodic pattern at a second spatial resolution; and
   a video processor directing the distinct spatial resolution signals processed at each halftone processor to said printer to print the processed color image.

2. The color document printing system of claim 1, wherein the number of color separations is at least three.

3. The color document printing system of claim 1, wherein said spatial resolution scaler comprises:
   color separation identification means for determining which color separation is being received from said source;
   spatial resolution selection means, responsive to the color separation received, for selecting spatial resolution pairs associated with the color separations; and
   two-dimensional scaling means for scaling the image signals of each color separation in accordance with the first and second spatial resolutions selected associated with the color separation.

4. The color document printing system of claim 1, further comprising spatial resolution determining means for predefining the spatial resolution pair for each color separation based upon a selected screen angle, a base dot pitch, and a desired halftone cell size.

5. The color document printing system of claim 4, wherein said spatial resolution determining means comprises:
an arithmetic processing unit for receiving the selected screen angle, the base dot pitch, and the desired halftone cell size and calculating desired spatial resolution pair; and
resolution memory for storing a plurality of desired spatial resolution pairs.

6. The color document printing system of claim 1, wherein said printer comprises a focused ion stream printer.

7. The color document printing system of claim 6, wherein said focused ion stream printer includes a plurality of apertures, each of said apertures being controlled in response to one of the distinct spatial resolution signals processed by one of said halftone processors.

8. The color document printing system of claim 1, wherein said printer comprises a polygon-based raster output scanner.

9. The color document printing system of claim 8, wherein said polygon-based raster output scanner is a multiple-pass scanner including a variable speed polygon motor operating in conjunction with a variable pixel frequency video driver.

10. The color document printing system of claim 8, wherein said polygon-based raster output scanner is a multiple-beam scanner including:
a photoreceptor; and
a plurality of polygons, each operating at different speeds, each polygon positioned so as to direct a beam to expose the photoreceptor at a unique exposure location.

11. A method for preparing a color document for moiré-free printing, the color document including a plurality of color separations wherein each separation is defined with a set of image signals representing optical density with m possible density levels, while a printer is capable of rendering density with n density levels, comprising:
receiving a set of image signals describing the color document with a plurality of color separations, each image signal representing optical density as one of m levels for a discrete area of a color separation;
spatially scaling the image signals of a first and second color separation;
halftoning the m level image signals of the first color separation to n level image signals representing optical density in a manner generating a first periodic pattern having a fixed frequency and a distinct first angle for the first separation;
halftoning the m level image signals of a second color separation to n level image signals representing optical density in a manner generating a second periodic pattern having the fixed frequency and a distinct second angle for the second separation; and
directing the first and second periodic patterns to said printer to print the processed color image.

12. The method of claim 11, wherein the step of receiving a set of image signals includes receiving at least three distinct color separations.

13. The method of claim 11, wherein said step of spatially scaling the image signals comprises:
determining which color separation is being received from said source;
selecting a spatial resolution pair associated with the color separation being received; and
scaling the image signals of the color separation in accordance with the spatial resolution associated with the color separation.

14. The method of claim 11, further comprising the step of predefining a spatial resolution pair for each color separation based upon a selected screen angle, a base dot pitch, and a desired halftone cell size.

15. The method of claim 14, wherein said step of predefining a spatial resolution pair comprises:
receiving the selected screen angle ($\alpha$), the base dot pitch (L), and the desired halftone cell size (n);
calculating desired spatial resolution pair values; and
storing the desired spatial resolution pair values in memory.

16. The method of claim 15, wherein said step of calculating desired spatial resolution pair values comprises:
determining the desired x-direction spatial resolution in accordance with the formula, $x=[(L \cos \alpha)/n]^{-1}$; and
determining the desired y-direction spatial resolution in accordance with the formula, $y=[(L \sin \alpha)/n]^{-1}$.

* * * * *